United States Patent

[11] 3,578,280

[72] Inventors James P. Laughlin;
Everett Worman, Evansville, Ind.
[21] Appl. No. 865,761
[22] Filed Oct. 13, 1969
[45] Patented May 11, 1971
[73] Assignee Whirlpool Corporation

[54] TWIST TO MOUNT CONDENSER MOUNTING GROMMET FOR REFRIGERATOR
9 Claims, 5 Drawing Figs.

[52] U.S. Cl. .................................................. 248/54,
248/68, 248/358, 285/137
[51] Int. Cl. ................................................. F16l 3/08
[50] Field of Search ........................................ 248/68, 68
(CB), 54, 69, 358 (R), 74; 285/137 (R); 24/81
(CC)

[56] References Cited
UNITED STATES PATENTS
551,032 12/1895 Hemphill ...................... 248/68

| | | | |
|---|---|---|---|
| 2,575,292 | 11/1951 | Persons ...................... | 248/74X |
| 2,650,948 | 9/1953 | Findlay .......................... | 248/68X |
| 3,370,815 | 2/1968 | Opperthauser .............. | 248/74 |

FOREIGN PATENTS
310,777 12/1969 Sweden ...................... 248/68

Primary Examiner—Chancellor E. Harris
Attorneys—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord ABSTRACT: A vibration isolation mounting for the tubular coils of a refrigerator condenser having a resilient rubbery block for both mounting the condenser on a support structure and absorbing vibrations in the condenser so that these will not be significantly transferred to the support structure.

Patented May 11, 1971

3,578,280

INVENTORS.
JAMES P. LAUGHLIN
EVERETT WORMAN
BY Hofgren, Wegner, Allen, Stellman & McCord.
ATTORNEYS

TWIST TO MOUNT CONDENSER MOUNTING GROMMET FOR REFRIGERATOR

One of the features of this invention is to provide a vibration isolating mounting for the tubular coils of a refrigerator condenser in which there is provided a resilient rubbery block engaging a pair of adjacent tubes of the coil, a spring metal clamp in a passage in the lock and an attaching means engaging the clamp for attaching the mounting and thus the coils to a support structure.

Other features and advantages of the invention will be apparent from the following description of one embodiment thereof taken in conjunction with the accompanying drawings. Of the drawings.

Figure 1:
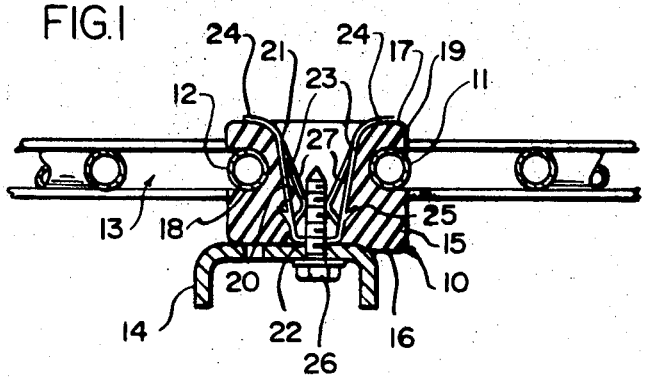
FIG. 1 is a sectional view through one embodiment of a mounting for the coils of a refrigerator condenser.

In the embodiment illustrated in the accompanying drawings the vibration isolating mounting 10 is adapted to be located between an adjacent pair of tubular coils 11 and 12 of an appliance heat exchanger, herein a refrigerator condenser 13 in order to mount the condenser on a support structure illustrated by the support frame 14. The mounting 10 comprises a resilient rubbery block 15 which may be of natural or synthetic rubber that is of generally rectangular cross-sectional shape and provided with a pair of substantially parallel opposite ends 16 and 17. The block 15 also has a pair of coil-engaging grooves 18 and 19 in opposite sides thereof and nearer to the end 17 than to the end 16.

Extending through the block 15 from one end 16 to the opposite end 17 is a passage 20 that tapers from a small opening through the block end 16 outwardly to a larger opening at the opposite block end 17.

Positioned within this passage 20 is a spring metal clamp 21 that has a bight 22 located adjacent the one block end 16 and a pair of side branches 23 that flare outwardly away from each other and lie along the surfaces forming the passage 20. The extreme ends of the branches 23 are provided each with an outwardly flaring flange 24 that are substantially coplanar to lie against the end 17 of the block that is opposite the end 16 where the bight 22 is located.

The clamp 21 at the branches 23 includes a plurality, here shown as four, of sharply pointed projections 25 that penetrate the block 15 as illustrated in FIG. 1 to retain the clamp and block assembled prior to being positioned between the coils 11 and 12.

To complete the mounting there is provided an attaching means embodied in the screw 26 that extends through an opening in the support frame 14 and is threaded to the bight 22 so that the clamp serves as a nut for this screw 26.

As is illustrated, the attaching screw is preferably elongated and the branches 23 are each provided with inwardly raised sections 27 that are engaged and pressed apart by the screw 26 to hold the branches 23 tightly against the inner surfaces of the block forming the central passage 20.

Figure 2:
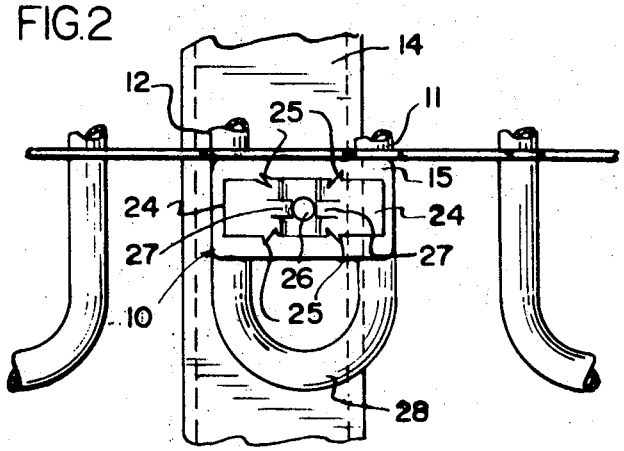
FIG. 2 is a fragmentary plan view of this embodiment of the invention.

As illustrated in FIGS. 1 and 2 the mounting 10 may be located between adjacent tubes 11 and 12 that are connected by a bend 28. The rectangular shape of the block 15 permits positioning the clamp between such tubes because it can be twisted into position. When mounted, as illustrated in FIG. 3, such twisting is not required as then the mounting may merely be pushed into position between the tubes 29 and 30.

As can be seen from the above description, the mounting for the tubular coils of the condenser is simple in construction yet provides a strong structure for attaching to a frame or other support not only to mount the condenser but also to absorb vibration. Furthermore, the same mounting may be used, as illustrated in FIGS. 2 and 3, regardless of whether it is located within a tube loop or bend 28 as shown in FIG. 2 or in a space between adjacent tubes as shown in FIG. 3. The mounting also serves to isolate the condenser from the supporting frame structure so far as both vibration and thermal transfer are concerned because the rubbery block 15 also acts as a heat insulator.

Figure 3:
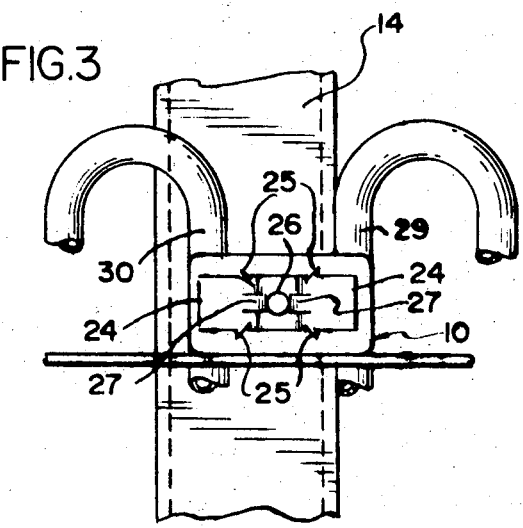
FIG. 3 is a view similar to FIG. 2 but illustrating the positioning of the mounting on the coils in a different arrangement.
Figure 4:
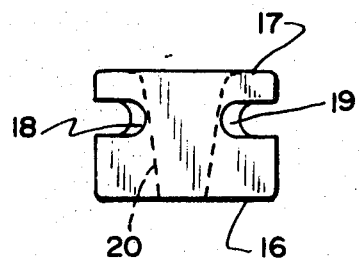
FIG. 4 is a plan view of the resilient rubbery block of the mounting.
Figure 5:
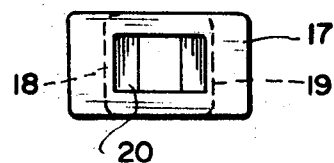
FIG. 5 is an end elevational view taken from the top end of FIG. 4.

The provision of the plurality of pointed projections 25 on the clamp 21 permits preassembling the block and clamp together prior to mounting on the support 14 and also permits insertion of this preassembled combination either within a loop or through the open end of adjacent tubes as in FIG. 3.

In installing the mounting the projections 25, as discussed, hold the block 15 and clamp 21 in preassembled relationship and then as soon as the screw 26 is forced between the sections 27 in mounting the device on the frame 14 the insertion of the screw automatically forces the clamp 21 and lock 15 into inseparable assembly.

Having described our invention as related to the embodiment shown in the accompanying drawings, it is our intention that the invention be not limited by any of the details of description, unless otherwise specified.

We claim:

1. A vibration isolating mounting for tubular coils of a heat exchanger comprising: a resilient rubbery lock having a pair of ends, coil-engaging grooves on a pair of opposite sides of said block between said ends and a passage extending through said block between said ends; a spring metal clamp in said passage having a bight, a pair of branches along opposite sides of said passage, and a flange on the end of a branch against a said end; a plurality of pointed projections on said clamp penetrating said resilient block to retain the clamp and block assembled prior to positioning between said coils; and an attaching means engaging said bight and extending into said passage between said branches for attaching said mounting and thereby said coils to a support.

2. The mounting of claim 1 wherein there is provided a flange on each of said branches extending away from each other and both located against a said block end to prevent movement of the block away from the attaching means.

3. The mounting of claim 2 wherein said flanges are located against a first block end and said bight is located adjacent an opposite second end of the block.

4. The mounting of claim 1 wherein said attaching means is elongated and said branches are provided with oppositely located sections engaged by the attaching means to press the branches apart into tight engagement with said block.

5. The mounting of claim 4 wherein said attaching means comprises a screw threaded to said bight, said sections comprise inwardly bowed portions of said branches.

6. The mounting of claim 1 wherein said block is of rectangular cross section transversely to said passage and said grooves are located at the opposite short sides of the rectangle and lie at right angles to said passage.

7. The mounting of claim 1 wherein there is provided a flange on each branch extending away from each other and both located against a said block end to prevent movement of the lock away from the attaching means, said flanges are located against a first block end and said bight is located adjacent an opposite second end of the block, and said attaching means is elongated and said branches are provided with oppositely located sections engaged by the attaching means to press the branches apart into tight engagement with said block.

8. The mounting of claim 7 wherein said attaching means comprises a screw threaded to said bight, said sections comprise inwardly bowed portions of said branches, and said block is of rectangular cross section transversely to said passage and said grooves are located at the opposite short sides of the rectangle and lie at right angles to said passage.

9. A vibration isolating mounting for the tubular coils of a refrigerator condenser, comprising: a resilient rubbery block having a pair of ends, coil-engaging grooves on a pair of opposite sides of said block between said ends and a passage extending through said block between said ends; a spring metal clamp in said passage having a bight, a pair of branches along opposite sides of said passage, and a flange on the end of a branch against a said end; an attaching means engaging said bight and extending into said passage between said branches for attaching said mounting and thereby said coils to a support; and oppositely located sections on said branches engaged by said attaching means to press the branches apart into tight engagement with said block.